patented Jan. 17, 1956

2,731,326

PROCESS OF PREPARING DENSE AMORPHOUS SILICA AGGREGATES AND PRODUCT

Guy B. Alexander, Greenville, Ralph K. Iler, Wilmington, and Frederick J. Wolter, Greenville, Del., assignors to E. I. du Pont de Nemours and Company, Wilmington, Del., a corporation of Delaware No Drawing. Application August 31, 1951,
Serial No. 244,722

27 Claims. (Cl. 23—182)

This invention relates to processes in which the structure of silica aggregates is reinforced in aqueous suspension with accreted silica, and to compositions which may be thus obtained; and is particularly directed to processes in which active silica is caused to accrete to supercolloidal aggregates having reticulated structures of open-packed, dense, amorphous silica spheroids which are from 5 to 150 millimicrons in diameter, by releasing active silica in an aqueous suspension of the aggregates while maintaining the pH of the suspension at 8 to 11, the alkali metal ion concentration below 1 normal, and the temperature in the range from 60 to 125° C., the release of active silica being effected at a rate such that the specific surface area of the precipitated silica present decreases; and is further directed to finely divided compositions in the form of supercolloidal aggregates having a specific surface area of from 60 to 400 square meters per gram, and consisting of dense, substantially uniform-sized, amorphous silica spheroids, joined together into open-packed, reticulated structures, the structures being uniformly reinforced with dense, amorphous silica; still more particularly, the invention is directed to such products which are pulverulent, dry gels, having a specific surface area of from 60 to 400 square meters per gram, and consisting of supercolloidal aggregates of reticulated, spheroidal units, the silica spheroids in the structures being so openly packed that the oil absorption in milliliters per 100 grams of solid is from 1 to 3 times the specific surface area in square meters per gram.

This application is a continuation-in-part of our co-pending United States applications, Serial No. 99,354, Filed June 15, 1949, and Serial No. 142,344, filed February 3, 1950, now both abandoned.

Some types of precipitated gels have been postulated to consist of aggregates made up to spheroidal units arranged in three-dimensional networks, and it has been recognized that in order to describe such gel networks in quantitative terms, consideration must be given to the size of the units and the density or openness of packing. We have found, however, that there is an additional critical factor which has not hitherto been recognized, namely, the degree to which these ultimate units are coalesced or joined to each other. According to the present invention it has been found that in the case of silica gels all of these factors taken together determine the extent to which the gel collapses upon drying from a liquid and the ease with which the dried aggregate structure can be mechanically disintegrated and dispersed. No method has hitherto been disclosed for controlling these factors to produce forms of silica gels which, when dried from a liquid, do not suffer a collapse of structure and yet are readily disintegrated mechanically to fragments of the chains of ultimate units which compose the gel structure.

The conventional silica gels of the so-called "xerogel" type, which may be prepared by such methods as neutralizing solutions of sodium silicate with an acid, or by hydrolyzing tetraethyl silicate, or silicon tetrafluoride, and drying the wet gel, are hard, highly porous, often chalky or glassy, and frequently possess high adsorptive capacities for gases, vapors, and liquids. Such hard, porous gels are useful as adsorbents and catalysts, but they cannot be readily disintegrated mechanically because they consist of ultimate units (usually smaller than 5 millimicrons in diameter) which are closely packed. Although the original wet gels may have consisted of ultimate units in an open-packed network, drying the gels to xerogels caused a collapse or shrinkage of their structure to close-packed networks. Because of this close-packed structure, further shrinkage does not occur when the xerogel is re-wet and re-dried.

The spaces between the ultimate silica units in silica gels are often referred to as "pores," and various ways of modifying the properties of gels have been proposed, mainly with the idea of changing the "pore size." Thus, the prior art discloses means of increasing the porosity of conventional silica gels by heating the gels in steam, but during such a process the gel structure is converted to a strong, porous, sponge-like mass which is not readily disintegrated mechanically.

It has been proposed to fill the pores with a solid material, such as ferric hydroxide, to prevent collapse during drying, but this is not very effective, since the resulting product is difficult to disperse.

Fluffy, finely-divided forms of silica gel of relatively low-bulk density have been produced by prior art methods which involve mechanical disintegration of fresh wet gel; the small pieces of gel, upon drying, shrink to hard aggregates of close-packed ultimate units. These aggregates cannot be broken down by mechanical means to the ultimate units or to colloidal fragments consisting of only a few ultimate units. The observed low bulk density of a mass of such material is explained by the fact that the individual aggregates may be collected into a loosely packed pile.

It has been suggested that the high surface tension of water causes silica gel to collapse when dried from this liquid. However, even if the water in a conventional silica gel is replaced with an organic liquid such as ethanol or propanol, and the liquid is then distilled off at atmospheric pressure, the structure still readily collapses.

It has been proposed to avoid the collapse of silica aquagels upon drying by heating the aquagel under pressure to above the critical point and releasing the vapors. The critical pressure may be reduced by replacing some of the water with an organic liquid. The products, which have been termed "aerogels," are easily disintegrated mechanically. However, the "aerogel" structure is so weak that when it is wet with a liquid, e. g., water, alcohol, or the like, and re-dried, it collapses and shrinks to a form which is difficult to disintegrate or disperse. Therefore, "aerogels" cannot be recovered by direct methods of drying, and cannot be employed effectively in uses involving intermediate solvent wetting and drying.

Finely divided silica has also been produced in the form of loose-packed aggregates by burning volatile silicon compounds. However, the size of the ultimate units is not uniform. The lack of reinforcement of the aggregate structure or coalescence of the ultimate units is also a disadvantage for many uses.

In our co-pending United States application, Serial No. 99,350, now Patent No. 2,601,235, and in a co-pending United States application of Ralph K. Iler, Serial No. 99,349, now abandoned, both filed June 15, 1949, there have been described certain methods for building up dense, ultimate units of silica to sizes substantially larger than are present in ordinary silica gels and for aggregating such built-up units to form precipitates. Such aggregates are readily distinguishable from conventional silica gels, in that the former are made up of ultimate units which are larger than 5 millimicrons in diameter;

on the other hand, the size of the ultimate units does not exceed 150 millimicrons and preferably does not exceed 50 millimicrons. In common with undried silica gel, such undried aggregates may be made up of dense, ultimate units joined in a loose, open network with voids or pores in between the silica particle chains. In contrast to undried silica gel, the aggregates of larger silica units above described are substantially easier to filter out of water and dry. There is still considerable shrinkage upon drying, however, and the dried product is more closely packed and less readily disintegrated than is desired for many purposes.

Reinforcement of supercolloidal aggregates of ultimate silica units with accreted silica to prevent collapse of the structure upon drying is disclosed in our co-pending United States application, Serial No. 142,344, filed February 3, 1950, of which the present application is a continuation-in-part.

It is an object of this invention to provide reinforced supercolloidal silica aggregates consisting of extremely small, dense, amorphous silica units which can be dried directly from a liquid medium to yield a product which can be readily disintegrated and dispersed in a fluid or plastic medium by simple mechanical means. Another object is to provide a form of silica which can be used in rubber as a superior reinforcing filler. A further object is to provide a silica product which can be readily dispersed in organic liquids to give a maximum thickening effect, such as in preparing a lubricating grease. A still further object is to provide a method of producing reinforced, supercolloidal silica aggregates. Further objects will appear hereinafter.

Now according to the present invention it has been found that the basic structure of aggregates of dense, ultimate silica spheroidal units can be reinforced by causing active silica to accrete to the aggregates, the accreted silica acting as cement or mortar to hold the spheroids together. The aggregates may be made up of extremely small ultimate spheroidal units in the range from 5 to 150 millimicrons in diameter. The active silica which accretes to the aggregates is released in an aqueous suspension of the aggregates while maintaining the pH of the suspension at 8 to 11, the alkali metal ion concentration below 1 normal, and the temperature in the range from 60 to 125° C., and is released at such a rate that the specific surface area of the precipitated silica present decreases. The products obtained have a basic structure which is strengthened and reinforced by the presence of dense, accreted silica, so that they may be dried directly from a liquid at ordinary temperatures and at atmospheric pressure, without collapse of the basic structure.

The dry products obtained may be referred to as "reinforced silica xerogels" or as "reticulates of ultimate silica units" or "reticulated silica." Literally, the word "reticulate" means "having the form or appearance of a network," but with reference to the structure of matter it has come to include any joining together or coalescence of particles of a substance through bonds consisting of a substantial mass of the same substance, the mass of the bond being small relative to that of the particles joined and the particles or ultimate units retaining their separate identities. Reticulated aggregates may be formed of ultimate units bonded together in a chain-like network, so that, under an electron microscope, they appear much as beads on a string. These may be called "chain" reticulates. The aggregates may be in the form of clusters of ultimate units—that is, a three-dimensional type of aggregate. There may be a combination of the two forms of reticulation, and the reticulated products may thus consist of clusters of chains in three dimensions. These concepts have also become well established recently with respect to carbon blacks for use in rubber. (See, for example, the article on "Shape factor and other fundamental properties of carbon black," by L. H. Cohan and J. H. L. Watson, in Rubber Age, volume 68, p. 687, for March 1951.) The concept of reticulation is well established; it is herein applied to aggregates of amorphous silica spheroidal units.

The concept of reinforcing reticulated silica structures by means of accreted silica has not hitherto been disclosed. The main problem of reinforcing aggregates involves the controlled use of active silica. Since active silica has a very strong tendency to polymerize with itself to form gels in aqueous systems, it has not been apparent how silica gels or aggregates could be reinforced by building up the bonds between ultimate units by adding active silica. Methods which have been proposed for making "fine silica" or "powdered silica" give as products finely-divided silica gel, the fragments of which are characterized by being porous and spongy, but are not reinforced with accreted silica. Fragments of porous silica gel have been joined into larger agglomerates through surface forces or by using as a bonding agent another substance such as an organic adhesive, but the products thus produced have a heterogeneous character, and are non-uniform, and are quite unlike the products of the present invention.

THE ULTIMATE SILICA SPHEROIDAL UNITS

The character of the ultimate units from which reticulated products are made is observable by means of the electron microscope, which shows that even in aggregates, the spherical shape of the individual ultimate units persists. The ultimate spheroidal units are also dense, in the sense that they have demonstrable form and substance, in contrast to the low molecular weight silicic acid present in freshly prepared silica sols. The fact that the surface area as determined by nitrogen adsorption corresponds to the size of the units as observed by the electron microscope, indicates that the ultimate units are dense and non-porous. (See, for example, p. 688 of the Watson reference given above.) The ultimate units range in size from about 5 to 150 millimicrons, but preferably have an average diameter of from 5 to 50 millimicrons, since in this size range they can be readily aggregated and since they have a sufficiently high surface area to permit the accretion process to be carried out at a convenient rate. The ultimate silica units are amorphous. They are definitely non-crystalline, and are substantially spherical or spheroidal in shape.

Aqueous suspensions of the ultimate units may be prepared in various ways. For example, dense silica units may be prepared by heating to a temperature above 60° C., a silica sol (prepared by ion-exchange in the manner described in Bird United States Patent 2,244,325 and stabilized with a small amount of alkali), and adding further quantities of the same type of sol until at least five times as much silica has been added as was at first present. This product is fully described in Bechtold and Snyder United States application, Serial No. 65,536, filed December 15, 1948, now Patent No. 2,574,902.

Instead of using a process of the Bird patent for preparing silica sols to be treated by the processes of Bechtold and Snyder, the process of the Voorhees United States Patent 2,457,971, employing an ammonium form of ion-exchanger, may be used. Similarly, any other method of preparing a substantially salt-free sol of low molecular weight silica may be employed in this build-up method to give dense silica units.

Instead of the processes outlined above, a suspension of dense units of silica useful in the processes of the present invention may be prepared by adding an acid such as sulfuric to a hot (above 60° C.) solution of sodium silicate. The addition is conducted over a period of time at a sodium ion concentration of not more than 1 normal. This method is described more fully in Iler United States application, Serial No. 99,349, filed June 15, 1949. Instead of following this Iler application, a product of the same type may be prepared by heating a silica sol to a temperature above 60° C., and adding thereto a sodium silicate solution and enough of an acid at a controlled rate such as to maintain a pH from 8 to 11, while maintaining the temperature above 60° C. and the sodium ion normality below 0.3 normal, the addition of silicate and acid being continued until the silica particles in the sol have reached the desired size. Details of such a process are described in our United States application, Serial No. 99,350, filed June 15, 1949.

In general, the above processes are particularly applicable for preparing ultimate units larger than about 15 millimicrons. A convenient method of preparing smaller units, i. e., in the range of 5 to 15 millimicrons, is to add an acid to a dilute sodium silicate solution at about room temperature, followed by heating the resulting slightly alkaline sol to the temperatures used during the accretion step of this invention.

THE AGGREGATES

As a starting material in a process of this invention, an aqueous suspension of aggregates made up of a plurality of spheroidal ultimate units such as just described is used. By "plurality" is meant two or more, but ordinarily the aggregates will contain a very large number of ultimate units, the number being so large that the aggregates appear in suspension as a precipitate. Aggregates larger than 100 millimicrons in diameter are defined as being supercolloidal.

Having prepared an aqueous dispersion of built-up dense silica units of a desired size by a method such as given above, the units are then coagulated into aggregates. The coagulation may be effected by adding small amounts of metal salts, by lowering the pH to a point of minimum stability, for example pH 5 to 8, or by any other means which will permit the negatively-charged silica units to come together and react at their points of contact, such as by splitting out water to form siloxane bridging groups. Organic coagulants, such as long-chain quaternary compounds of the type of lauryl pyridinium chloride may also be used. These methods of coagulation are described more fully in our United States applications 99,351, now abandoned, and 99,353, now abandoned, and Iler United States application Serial No. 99,355, all filed June 15, 1949, now Patent No. 2,663,650.

It is preferred to prepare aggregates in which the ultimate units are arranged in an open, porous network. Openness of packing is favored by bringing about aggregation of the ultimate units in a solution which is relatively dilute with respect to silica.

In the preferred case, aggregation is brought about by increasing the sodium ion concentration in a slightly alkaline dispersion of the ultimate units. As the sodium ion concentration is increased above about 0.3 normal, in a dispersion containing ultimate units in the size range from about 10 to 50 millimicrons, the charge on the silica units is progressively reduced, with an increase in the degree of aggregation, and it is preferred to operate in the range from about 0.3 to 0.5 normal. A high concentration of sodium ion leads to the formation of more compact and less open structures, and hence a sodium ion concentration above 1 N is not preferred.

The bonds holding an aggregate together need have an initial strength only sufficient to prevent spontaneous repeptization of the individual spherical units, because in a process of this invention the bonds become built up and reinforced substantially.

THE ACTIVE SILICA

When sodium silicate is acidified, silicic acid is released. This silicic acid initially may be in the form of orthosilicic acid, Si(OH)$_4$, but a condensation reaction occurs, whereby two silanol

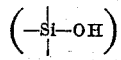

groups react to form a siloxane

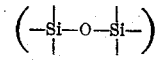

bond. This condensation may proceed until a predominate proportion of the silanol groups present have been used up to form siloxane bonds; the polymer thus formed will have a high molecular weight and the silica in it may be defined as "inactive." On the other hand, it will be understood that by the term "active" silica is meant silica in a low degree of polymerization. Thus, in active silica the condensation between silanol groups has not proceeded to a predominate extent.

It should be understood that active silica includes not only monomeric silica, but also certain polymeric forms of silica which are capable of depolymerization under suitable conditions, and hence are active for the purposes of the present invention. The rate of depolymerization under controlled conditions provides a measure of whether or not a particular silica is active within the meaning of the term as used in describing this invention. Active silica may be defined as any silica in molecular or colloidal aqueous solution in such a state of polymerization that when diluted with sodium hydroxide solution to a pH of about 12, corresponding to an alkali concentration of N/100, and an SiO$_2$ concentration of about 0.02% by weight at 30° C., in the absence of cations other than the sodium, the silica will depolymerize to monomer in not more than 100 minutes.

The amount of monomer in a particular solution may be determined by measuring the amount of color developed with molybdic acid. It was shown by Harman (J. Phys. Chem., vol. 31, 616–25 (1927)) that yellow silico-molybdic complex acid is formed by reaction of molybdic acid with ionic or "crystalloidal silica" but not with colloidal silica. We confirmed this observation, and concluded that only monosilicic acid forms the yellow complex with molybdic acid. Hence, the rate of depolymerization of silica in the dilute alkaline test solution can be followed over a period of time by taking samples and determining the amount of monomer present.

Specifically, the depolymerization test is carried out by adding the silica sample to such quantity of a dilute solution of sodium hydroxide that the pH of the mixture is about 12 (corresponding to 0.01 normality of alkali) and the total concentration of SiO$_2$ is 0.02%. This mixture is held at 30° C. for a measured time after preparation, and then tested for monomer. Five ml. of the depolymerizing solution are mixed with 45 ml. of a molybdic acid reagent made up by diluting 25 ml. of 1 N sulfuric acid and 10 ml. of 10% (by weight) ammonium molybdate solution to a total of 225 ml. The molybdic acid reagent is sufficiently acidic to stop the depolymerization of silica in the test sample. Thus, the time interval of depolymerization is taken as the time between the mixing of the silica sample with sodium hydroxide solution and neutralizaton of this solution with molybdic acid reagent. The color developed in the depolymerizing solution and the molybdic acid reagent at 30° C. is measured with a Model DU Beckman photoelectric quartz spectrophotometer at a wave length of 400 millimicrons. The color reading is taken after about two minutes, since the reaction of monomeric silicic acid with molybdic acid is essentially complete in that time. The amount of monomeric silica correspondng to this color is determined by standardizing the color against a known amount of sodium orthosilicate.

While silica which depolymerizes completely in not more than 100 minutes by the depolymerization test is considered to be active and may be used in the present invention, it is preferred to use silica which will depolymerize completely in not more than 30 minutes. In sodium silicate solutions having an SiO$_2$:Na$_2$O mole ratio below 3.9, the degree of polymerization of the silica is very low, since when these solutions are subjected to the depolymerization test for activity, the time required for formation of monomer is usually less than one minute. Consequently, the silicic acid released the instant these solutions are acidified is in an extremely active form.

An aqueous dispersion of active silica may be prepared at ordinary temperatures for use in this invention by any of a number of methods with which the art is familiar. Methyl silicate or silicon tetrachloride may be hydrolyzed with water under conditions to produce a dilute sol, or sodium ions may be removed from sodium silicate by ion-exchange resins as taught by Bird, United States Patent 2,244,325. The active silica obtained by any of these methods should be used as soon as prepared, because the condensation reaction mentioned above proceeds quite rapidly, rendering the silica inactive.

A method which has outstanding economic advantages in the preparation of active silica for use according to this invention consists in releasing active silica by partially neutralizing a soluble silicate, such as sodium or potassium silicate, with an acid such as sulfuric, hydrochloric, or carbonic, in the pH range of 8 to 11. Preferably, this acidification occurs in the presence of the aggregates of particles prepared as already described, so that the liberated active silica can immediately accrete to the aggrgates.

Instead of releasing the active silica in the presence of the aggregates (by the partial neutralization of a silicate with an acid), the acidification may, if desired, be carried on out of contact with the silica aggregates, provided the active silica is caused to accrete to such aggregates before it has become inactive through polymerization—that is, before it has aged or been heated to an elevated temperature.

In order to determine whether the degree of polymerization of the silica is such that it is still in the active range, it may be tested directly, as already described.

THE ACCRETION PROCESS

An accretion process of this invention is carried out by releasing active silica in an aqueous suspension of silica aggregates, the active silica and aggregates having been selected as described above. As used herein, the word "accrete" refers to a growing together, that is, an adding on or building up by growth, and "accretion" refers to this gradual external addition. In other words, the active silica builds up upon the structures already present in the aggregates and reinforces these structures by external growth, rather than extending the structures by adding on additional colloidal, spheroidal units to chains already present. As a result of accretion, the particle diameter of the utilimate silica units increases and the specific surface area decreases. During the process it is important to maintain the pH, the alkali metal ion concentration, and the temperature within certain critical limits. It is also important to release the active silica at a critical rate which is determined by the surface area of the silica particles present. These conditions will now be discussed in detail.

The pH during accretion is maintained in the range of about from 8 to 11. Above this range the active silica tends to remain in solution as alkali metal silicate, while below the range the active silica tends to gel before it has had an opportunity to accrete to the aggregates. When the active silica is released by simultaneous addition of acid and alkali silicate, it is preferred to maintain the pH at 9.0 to 10.7, and especially desirable to operate at about pH 10.

The alkali metal ion concentration is maintained below about 1 normal during accretion, and preferably is held below 0.5 normal. Above 1 normal, the rate of coagulation of the active silica is such that new aggregates tend to be formed, and this should generally be avoided. When the active silica is added in the form of fresh ion-exchange effluent the control of alkali metal ion concentration presents no problem. When the active silica is formed in situ by adding acid and alkali metal silicate, it will often be found desirable to use as high a $SiO_2:Na_2O$ ratio silicate as possible, and dilute the reaction mixture if necessary to hold down the alkali metal ion normality. A normality of 0.1 to 0.5 ordinarily is found to be a practical working range.

The temperature of the reaction mixture is maintained in the range from 60 to 125° C., and preferably about between 80 and 100° C. at atmospheric pressure, or up to about 125° C. under super-atmospheric pressures. Below 60° C., it is difficult to bring about the accretion reaction at a practical rate; and there is no apparent advantage in operating at temperatures above 125° C. It is most preferred to operate close to the boiling point at atmospheric pressure.

The rate at which accretion will occur is related to the pH, the alkali metal ion concentration, the temperature, and the specific surface area of silica in the aggregates. Accretion occurs rapidly at about pH 10, and in the presence of sodium ions. Active silica can be accreted more readily at a higher temperature. The relation between time and temperature may be roughly estimated from the observation that the reaction rate doubles for about every 10° C. rise in temperature, within the ranges above-mentioned.

As the specific surface area increases, there is more surface on which accretion can occur, and hence accretion can be carried out more rapidly in dispersions containing aggregates of high surface area. However, if active silica is liberated too rapidly in the mixture, it may fail to accrete to the aggregates, but instead may form new nuclei of dense spherical particles. In this event, two families of silica will be present, that is, the aggregates and the new nuclei. Upon further addition of active silica, these two families will compete for the active silica, with the result that the aggregates will not be reinforced and built up to the desired or expected extent.

During the accretion process, the release of active silica is effected at a rate such that the specific surface area of the precipitated silica present decreases. The precipitated silica present includes the aggregates upon which accretion is taking place and also any new aggregates or nuclei formed from the active silica. When active silica accretes as a dense coating on aggregates of silica units, the weight of the aggregates is increased more rapidly than the surface area, so that the specific surface area, which is the area per unit weight, actually decreases. If, however, active silica is added at a higher rate than can be taken up by the accretion, new nuclei of very small particles, having a very great specific surface area, are formed, and the average specific surface area of the precipitated silica in the system will increase, rather than decrease, as expected. Accordingly, it is important to control the rate of release of active silica so that the specific surface area of the precipitated silica in the system decreases during the accretion reaction. This can readily be determined by taking a sample after a particular rate of release and measuring specific surface area by nitrogen adsorption. For instance, a sample may be removed from the reaction medium and filtered on an ordinary Whatman #40 paper, or may be settled out by centrifuging at 3000 R. P. M. for 10 minutes. The precipitate is then reslurried in water, adjusted to a pH of from 3 to 5, refiltered, washed, preferably with water and then with acetone until free from water, and dried at 110° C. The specific surface area of the dried material is measured by nitrogen adsorption by the method of P. H. Emmett, "A new method for measuring the surface area of finely divided materials and for determining the size of particles," Symposium on New Methods for Particle Size Determination in the Sub-Sieve Range, p. 95, published by the American Society for Testing Materials, March 4 1941. If, for the interval in question, the specific surface area has decreased, the rate of active silica release has been satisfactory. Obviously, the decrease should occur over a reasonable interval of time—that is, over say 5% of the total time of the accretion reaction, because at a particular instant, such as immediately after adding an increment of active silica, there may be no change or even a slight increase in the specific surface area, whereas the net overall result is a decrease.

As a practical matter, of course, it is most feasible to establish a safe rate for releasing active silica, and thereafter maintain this rate by controlling the rate of adding the active silica to the system or the rate of adding the reagent which will release the active silica. In establishing this rate, proper correlation of temperature, alkali metal ion concentration, and pH must be taken into account. This is illustrated in the following preferred case, in which active silica is released by adding sodium silicate and acid simultaneously to a dispersion of silica aggregates.

At 95° C., a sodium ion normality of 0.3, and a pH of 10, and with the silica in the aggregates having a specific surface area of about 140 square meters per gram, 1.5 parts by weight of active silica may be added per hour for each part of silica already present as aggregates.

As the temperature is decreased, the rate of addition of active silica should likewise be decreased. Similarly, as the pH is decreased the addition rate of active silica should be decreased. The rate just mentioned for pH 10 should be decreased by a factor of about 2, if the pH is lowered to about 8. It will be understood that all pH readings are taken on samples cooled to 30° C.

The addition rate of active silica is also related to the sodium ion concentration. If the normality of $Na^+$ ion is decreased from 0.3 to 0.10, the rate of active silica addition should be decreased by a factor of about 2.

PROPORTION OF ACCRETION

The proportion of silica accreted to the aggregates is not limited from the process standpoint. However, there is little advantage in carrying the process of accretion to an extreme. Indeed, in preparing the preferred products of this invention, the process of accretion is limited so that the original dense ultimate units of the aggregates do not lose their identity and the original aggregate's structure is not obscured.

On the other hand, the proportion of accreted silica must be sufficient to establish definitely a coalescence between the individual silica units in the aggregates. It is convenient to speak of the proportion of accretion as "build-up ratio." A build-up ratio of 1:1 means 1 part by weight of active silica has been caused to accrete to 1 part by weight of silica in the non-reinforced aggregate. When the original aggregates consist of silica units which are in the size range of from about 5 to 15 millimicrons, a 1:1 build-up ratio or more will ordinarily provide sufficient reinforcement of the structure to impart valuable improvement. For instance, such a product can be dried without collapse of the reinforced structure by adding an organic liquid such as n-butanol and distilling out the water azeotropically, at atmospheric pressure. Even a 0.5:1 build-up ratio provides valuable strengthening of a silica gel structure. When the original aggregates consist of silica spheroids from 15 to 150 millimicrons in diameter, a 1:1 build-up ratio will ordinarily provide sufficient reinforcement of the structure that the product can be dried directly from water without collapse of the reinforced structure.

As a result of accretion, the average diameter of the ultimate spheroidal units will be increased. Thus, a build-up ratio of 1:1 on a 5-millimicron unit will increase its diameter to about 7 millimicrons.

Ordinarily, a build-up ratio of less than 4:1 is preferred, since at a build-up ratio greater than 4, accreted silica tends to cause the original units to lose their identity, and the resulting product is difficult to disperse. However, for very strong, porous structures, which may be needed for certain uses, e. g., catalysts, it may be desirable to carry the build-up ratio beyond 4:1.

RECOVERING DRY PRODUCTS

The reticulated particles can be filtered off or centrifuged out of the reaction mixture. The filtration may be assisted by the addition of a small amount of long-chain quaternary ammonium base. On the other hand, a metal salt may be used, say from 2 to 5% of zinc sulfate based on the weight of the silica, after first adjusting the pH of the mixture so as to permit adsorption of metal ions on the silica. In general, the pH should be slightly above the point where the metal ions, in the absence of silica, would be precipitated as hydroxides. The zinc, or other polyvalent metal such as calcium, magnesium, aluminum, or iron is thus surface-reacted with the reticulates and present in the final product. Alternatively, improvement in the ease of filtration may be obtained by aging the final slurry at a temperature in the range of 60° C. to 100° C. for several hours.

The product filtered off as above described may be washed to remove any soluble salts present. The wash water should preferably contain some acid to reduce the alkalinity of the product. When the specific surface area of the silica is less than about 200 m.$^2$/g., the filter cake may be dried directly by heating to drive off the water without causing significant shrinkage or collapse of the reinforced aggregate structure. The dry pulverulent cake is readily disintegrated to a fine, light, fluffy powder. Ordinary attrition methods of grinding are suitable, but the grinding should be no more intensive than necessary to break down any agglomerates to the desired size.

When the reinforced silica products of this invention have a specific surface area greater than about 200 m.$^2$/g., it is preferred to dry them by replacing the water with an organic liquid of lower surface tension. The products may be filtered or settled out of the aqueous medium in which they were prepared, the filter cake or settled solids washed once or more with the organic liquid, and/or the liquid may be added to the water-wet silica and water may be removed by distillation, as, for example, in an azeotrope with the organic liquid. It is often advantageous to use an organic liquid having a boiling point higher than that of water.

Examples of organic liquids which can be used to advantage include, methyl, ethyl, isopropyl, n-propyl, n-butyl, and tert-butyl alcohols, acetone, diethyl ether, methyl isobutyl carbinol, ethyl acetate, or butyl acetate. It is preferred that the organic liquid used be at least partially miscible with water. The principles of azeotropic distillation are well known and one may use as the organic liquid many of the organic liquids shown for binary or ternary systems in Analytical Chemistry, vol. 19, No. 8, at page 508, et seq. (August 1947), in the Table of Azeotropes and Non-Azeotropes, by L. H. Horsley.

The dried products obtained by such organic liquid dehydration are not collapsed during drying. They are very voluminous, free-flowing powders.

THE PRODUCTS

The finely divided reinforced products of this invention are in the form of supercolloidal aggregates consisting of dense, substantially uniform-sized amorphous silica spheroids joined together into open-packed, reticulated structures, the structures being uniformly reinforced with dense, amorphous silica. In order to characterize specifically those of the products which are particularly practical and remarkably useful, for example, as reinforcing fillers, it is necessary to limit:

(a) The size of the ultimate spheroidal units.

(b) The openness of packing of the ultimate units in the reticulated aggregate structure.

(c) The extent to which the structure is reinforced.

(d) The uniformity of the structure.

*Size of the ultimate spheroidal units.*—The size of the ultimate spheroidal units is one of the important factors which must be taken into account in describing the open, three-dimensional aggregates. The number average diameter of the ultimate units can be calculated from measurements made on a large number of such units by examination with the electron microscope as described hereinafter. In addition, the specific surface area of the products is inversely related to the diameter of the dense (i. e., non-porous) ultimate units. Specific surface area may be determined by the nitrogen adsorption method of Emmett, as above described. Since this method is usually more convenient than the direct measurement of particle diameters, it is preferred to characterize the products in terms of their specific surface area. It has already been pointed out that the preferred diameter of the dense ultimate units in the aggregates which are reinforced according to a process of this invention is from 5 to 50 millimicrons. The specific surface areas of the preferred products resulting from reinforcement of aggregates of ultimate units in this size range will lie within the range of from 60 to 400 m.$^2$/g. This, then, is the surface area range of the preferred products of this invention. It is extremely difficult by this process to control the reinforcement of silica gels composed of ultimate units which have a diameter less than 5 millimicrons. When the ultimate units are about 5 millimicrons in diameter, and when the build-up ratio is about 0.5:1, the final product will have a specific surface area of about 400 m.$^2$/g.

*Openness of packing.*—Another important characteristic of these silica products is the openness of packing of the ultimate units in the aggregates. The packing in gel structures can vary over wide limits, as has been discussed by E. Manegold, Koll. Zeits., vol. 96, 186–210 (1941); a review of the theory of gel structures, including the case of gels made up of spheroidal units, is given in Kruyt in Colloidal Science, vol. 2, 488–490 (Elseiver Publishing Co., N. Y., 1949).

It is believed that in the process of this invention, the open structure of the aggregate is not appreciably changed by the accretion of silica; that is, the arrangement of the ultimate units is not altered. However, the accretion of silica on the ultimate units results in a decrease in pore volume, but this does not change the geometrical arrangement of the ultimate units in the structure.

Linseed oil absorption gives a measure of openness of packing, the more open the packing, the greater the oil absorption. The test may be carried out as described in A. S. T. M. Standards for 1949, vol. 4, p. 169. A 0.5 to 1.0 gram sample of the powder which has been dried at 110° C. is placed on a glass plate and raw linseed oil is added drop by drop, the mixture being stirred and gently mashed by means of a steel spatula until crumbling just ceases, and the product can be molded into a ball. As the sample of powder is titrated with oil, the oil penetrates the pores of the powder, filling all void space, both intra- and inter-aggregate. The powder remains essentially dry in appearance until the pores within the aggregates are filled, and then becomes increasingly cohesive as the voidage between the aggregates is filled. At the point that all free space is filled, the material loses its friable nature and can be molded into a ball. The amount of oil required in the test is expressed in terms of ml. of oil per 100 grams of powder. For the products of this invention, the oil absorption depends upon the openness of packing of the ultimate units and the specific surface area. By comparing oil absorption at constant specific surface area, a measure of the openness of packing can be obtained. The products of this invention have an oil absorption expressed in milliliters of oil per 100 grams of powder of from 1 to 3 times the specific surface area in square meters per gram.

*Extent of reinforcement.*—A third important factor determining the nature of the products of this invention is the extent of reinforcement of the aggregates or the strength of bonding between the ultimate units in the three-dimensional network. The places where the ultimate units in a gel adhere to each other have been referred to as "junction points." The forces by which the ultimate units may be held together at these "junction points" have not hitherto been understood. We have found that in the case of the silica aggregates which are reinforced by accretion of silica according to the processes of this invention, the ultimate units become cemented together at the "junction points." We have called this cementing action "coalescence." The degree of coalescence may be measured by either of two methods: (a) a controlled depolymerization of the silica, measuring what per cent of the silica must be dissolved before the aggregates disintegrate to the ultimate units which disperse to a colloidal sol; this is called the "coalescence factor"; and/or (b) a comparison of the calculated specific surface area, $S_c$, which the ultimate units observed in electron micrographs would have if they were not reticulated, with the actual specific surface area of the reticulated aggregates as measured by nitrogen adsorption, $S_n$; the ratio $S_c/S_n$ is called the "reticulation factor."

*Depolymerization method for determining coalescence.*—The percentage of silica which must be dissolved in order to disintegrate the super-colloidal aggregates to units of colloidal size is called the "coalescence factor." A test has been devised in order to determine this factor. The sample, properly prepared, is suspended in and permitted to dissolve slowly in a dilute solution of alkali. In the course of this dissolution, the course of the disintegration of the aggregates is observed by noting the decrease in the turbidity of the suspension. The aggregates, being supercolloidal in size, cause the suspension to be initially turbid; as the aggregates are disintegrated the turbidity of the suspension decreases and the transmission of light through the suspension increases. Simultaneously the amount of silica which has passed into solution is determined analytically. From a curve obtained by plotting the percentage transmission of light through the suspension versus the per cent silica which has dissolved at the corresponding moment, the coalescence factor is determined as hereinafter described.

This test is applicable to products having a specific surface area in the range of 60 to 400 m.$^2$/g., which is the preferred range for the products of this invention. The coalescence factor is determined by the following standardized method: The specific surface area is measured by nitrogen adsorption, as already described. Unless it is known that the dry powder is free from organic matter, a sample is ignited in a vertical tube in a slow stream of air, increasing the temperature in one hour from 250 to 450° C. Further ignition for 30 minutes at 450° C. in pure oxygen is employed to remove last traces of organic matter. Acid soluble components are removed by leaching the ignited sample (or a sample free from organic matter) in hot (80–85° C.) 2N HCl for 30 minutes and then washing to a pH of 4 with a minimum amount of water to remove any metal ions. Solids content of the resulting wet silica is determined by evaporation and ignition (to 450° C.) of a separate weighed sample.

The coalescence determination is carried out on a sample of the wet silica containing 1 gram of solids. The sample is diluted to 100 ml. with water, warmed to 50° C. in a stirrer equipped flask, and titrated with 1.0 N NaOH. Sufficient base is added immediately to raise the pH to about 11.2 (1.0 mol per 90 m.$^2$/g. of specific surface area, but not less than 1.5 ml. nor more than 4 ml.), and further steady addition is maintained at such a rate as to hold the pH as close as possible to 11–11.5. During this treatment, depolymerization, or solution of polymeric silica occurs because of the presence of hydroxyl ions. The product of this depolymerization is monomeric sodium silicate. The reaction of this monomeric silicate with acid molybdate reagent prepared from ammonium molybdate and sulfuric acid results in the formation of a yellow silico molybdate complex, $SiO_2 \cdot 12MoO_3 \cdot xH_2O$. It has been demonstrated that the color intensity of this complex is proportional to the amount of monosilicic acid which has reacted with the molybdate reagent. Not only does the molybdate reagent react rapidly with monomeric silicic acid, but the acid nature of the reagent practically arrests depolymerization of any high molecular weight colloidal silica present when an aliquot of the silica sample is mixed with the acid molybdate reagent. The reaction of this agent with monosilicic acid can therefore be used to determine the amount of monomer present in the depolymerizing solution at any given time.

The percentage transmission of light through the test solution and the percentage of the silica which has passed into solution are measured as frequently as possible during the depolymerization treatment. Transmission is measured by means of a model DU Beckman Quartz Spectrophotometer at a wavelength of 400 millimicrons and a cell length of 1 cm. In making the analysis for dissolved silica, a 0.1 ml. aliquot from the depolymerization medium is diluted to 50 ml. with a freshly prepared 0.1 N $H_2SO_4$ solution of ammonium molybdate (this solution contains 4.0 g. of $(NH)_6Mo_7O_{24} \cdot 4H_2O$ per liter) and the optical density of the resulting solution is measured on the spectrophotometer. Distilled water is used as the reference solution for these measurements. The depolymerization is followed in this manner until about 80 or 90% of the total silica has been dissolved. This may be estimated from the fact that the sample was chosen to contain about 1.0 mg. of silica, and under the conditions of this experiment, if all of the silica were in the form of monomer, the optical density would be 0.72. In order to accurately determine the total silica content of the aliquot taken, the solution is then made about 0.5 N in NaOH and heated in live steam in an alkali-resistant flask for at least 2 hours, so that the last traces of silica are depolymerized to monomer. Total silica is then determined by the molybdic acid method above, and percentage silica at any point during the polymerization is determined from the ratio of the optical density at that point to the optical density after all the silica in the sample was converted to monomer.

For samples composed of substantially spheroidal, dense ultimate particles which are aggregated or reticulated, the percentage of silica involved in the bonding or coalescence of these ultimate units is shown by the position of the inflection point in a plot of percentage soluble silica versus transmission.

The percentage soluble silica at the inflection point is termed the "coalescence factor" of the sample. The preferred products of this invention have a coalescence factor of from 30 to 80%. A coalescence factor of 30% corresponds to a build-up ratio of about 0.5:1, whereas a coalescence factor of 80% corresponds to a build-up ratio of about 4:1.

*Surface area method of determining coalescence.*—This method of measuring coalescence is based on the surface area losses resulting when particles are cemented together. The term used to describe the result is the "reticulation factor." It is the ratio, $S_c/S_n$, where $S_c$ is the specific surface area calculated from electron micrograph measurements, and $S_n$ is the specific surface area as measured by nitrogen adsorption.

When active silica accretes to a single, spherical, dense nucleus, the surface area increases, and in addition, the weight of the particle increases. These two changes occur in such manner that the specific surface area, which is the surface area per unit weight, decreases. If two or more substantially spherical particles are joined together in an aggregate, and accretion occurs on the surface of the aggregate, the surface area in the crevice between two adjoining units is lost as the result of silica deposition in the crevice. Consequently, there is a greater decrease in specific surface area when accretion occurs on aggregated units, than there is when accretion occurs on discrete units. This decrease in specific surface area is more pronounced when the network is more compact, i. e., the number of contact points per particle is greater. The reticulation factor, $S_c/S_n$, takes into account this decrease in specific surface area in defining the extent of reticulation. Thus, $S_n$ is the actual specific surface area of the reticulated aggregates determined by nitrogen adsorption, as already described above, whereas $S_c$ is the calculated specific surface area which the ultimate units would have if they were not reticulated. $S_c$ may be determined by electron microscope examination in the following manner:

First, the silica is spread out in an extremely thin layer and examined by the electron microscope, whereby the reticulated structure is visible in silhouette. It is not always possible to determine by direct observation the degree to which the roughly spherical units are interconnected, since the three-dimensional reticulated structure may resemble a pile of individual units lying only loosely upon each other. However, it is possible to measure the average diameter of the units. By examining the silhouette of the particles it is possible to measure the diameter of the ultimate units in those cases where the particles are lying in such a way as to present more than a semi-circle of cross-section of a given unit. Where less than a semi-circle of cross-section of a unit can be observed due to the fact that it is obscured by other particles, the unit is not measured. However, by counting and measuring a large number (several hundred) of units which are lying in such positions as to present at least a semi-circle of silhouette, the number average diameter, $d_n$, the surface area average diameter, $d_s$, and the size distribution of the ultimate units can be determined. From the surface area average diameter, a specific surface area, $S_c$, can be calculated. This is the specific surface area which the ultimate units would have if they were discrete, unreticulated particles, having their entire surface exposed.

In counting the units, they are grouped according to diameter, as measured in millimicrons; each group consists of units lying within a five millimicron range, for example, 10–15 millimicrons, 15–20 millimicrons, 20–25 millimicrons, etc. The surface area of the units within each group is calculated from the average diameter of the group and the number of units within the group. The total surface area of all the counted units may then be calculated by summation of the areas in each group. The specific surface area is this total surface area, divided by the total mass of the particles counted, the latter being determined by summation, using the known density of the silica.

In carrying out this calculation, it is convenient to calculate first a "surface area average diameter," $d_s$, which would be the diameter of a spherical unit having the same specific surface area as that of the total collection of counted units.

This may be expressed mathematically, as follows:

$$d_s = \frac{\sum_{i=1}^{i=k} n_i d_i^3}{\sum_{i=1}^{i=k} n_b d_i^2}$$

where $n_i$ is the number of units in the $i$th range of sizes, the mean diameter of each being $d_i$ (e. g., $d_i = 12.5$ for the range 10–15 millimicrons) and $k$ is the number of size ranges.

The specific surface area, $S_c$, expressed as square meters per gram, may then be calculated from $d_s$, measured in millimicrons, taking the density of silica to be 2.2 grams per cc., which is the density of amorphous anhydrous, nonporous silica $$S_c = \frac{6 \times 10^3}{\text{density} \times d_s} = \frac{2720}{d_s}$$

It will be kept in mind that this "calculated specific surface area," $S_c$, is based on the assumption that the particles which were counted were all independent spherical units not interconnected with each other. However, the fact that these particles are interconnected means that the true specific surface area of the sample is actually less than $S_c$. The actual specific surface area, $S_n$, is next determined by the nitrogen adsorption method of Emmett, as mentioned above.

It will be evident that the ratio of $S_c$ to $S_n$ is proportional to the diminution in surface area resulting from the interconnection of the particles. The ratio of $S_c/S_n$ is defined as the "reticulation factor." Theoretically, for molecularly smooth spheres not interconnected by accreted silica, the ratio $S_c/S_n$ should be 1.0. However, it is believed that the ultimate units may not be perfectly smooth and the specific surface area calculated from electron micrographs may be 10 to 20% less than the area measured by nitrogen adsorption. Thus, for units which are not connected, the experimental value of $S_c/S_n$ ranges from about 0.8 to 1.0. Values higher than this indicate the extent to which the particles are fused, merged, or coalesced together. The reticulation factor is particularly applicable for characterizing products in which the spheroidal units are most accurately measurable by the electron microscope—that is, spheroidal units down to about 15 or 20 millimicrons in diameter. The preferred reinforced products of this invention have a reticulation factor of greater than 1.1.

The arithmetic mean particle diameter is simply the number average particle diameter, $d_n$, which is determined from the formula $$\frac{\sum_{i=1}^{i=k} n_i d_i}{n}$$

where $n_i$ and $d_i$ are defined as before and $n$ is the total number of particles counted.

The particle counts are made from electron micrographs taken at 5,000 diameters magnification enlarged to 25,000 diameters by conventional photographic printing techniques and finally projected on a screen to a total magnification of about 250,000 diameters. Methods of mounting the samples, and counting and measuring the particles are described by J. H. L. Watson in an article entitled "Particle size determination with electron microscopes" in Analytical Chemistry, volume 20, pages 576–584 for June 1948. The method of calculating particle size distribution is described in an article by L. R. Sperberg and H. M. Barton in "Rubber Age," volume 63, pages 45–51 for April 1948.

*Uniformity of the structure.*—Accretion of silica occurs substantially uniformly on the entire structure, and the ultimate units are of a relatively uniform size. However, it is possible to use mixtures of ultimate units of various controlled sizes in forming the aggregates where such a product may be desirable for a particular use, but this is not preferred.

The uniformity of the structure may be demonstrated in the process of carrying out the measurement of the coalescence factor by controlled depolymerization of the silica. Thus, the per cent light transmission of the sample is measured with the Beckman Spectrophotometer at a wave length of 400 millimicrons and a cell length of 1 centimeter, after 90% of the total silica has been dissolved, using water as the reference liquid. The percentage transmission as measured in this way is termed the "uniformity factor." If the uniformity factor of the sample is greater than 75%, the sample is substantially uniform. In cases where the reinforcement of the structure is non-uniform, the depolymerization test will cause disintegration of the structure at the weakest, least reinforced points first, and will not disrupt certain of the highly reinforced points even after 90% of the total silica has been dissolved. Consequently, a number of large fragments of the structure remain at this point, substantially reducing the transmission of the sample.

The uniformity of the structure can also be observed by means of the electron microscope. This method shows that the ultimate units are of a uniform size and that the "junction points" between ultimate units are reinforced to a uniform degree.

Other characteristic properties of the products of this invention may be measured as follows:

*Specific hydroxylated surface area by dye adsorption.*— The specific hydroxylated surface area of the products of this invention can be measured by a dye adsorption method. This test indicates the surface area per gram of silica which is available to the methyl red dye molecule. For this test, it is necessary that the sample be dried at least 4 hours at 110° C., in an air oven, but in no case at a higher temperature than 150° C. This limitation on drying is necessary, since it is believed that methyl red is adsorbed only on a hydroxylated surface, that is, a surface covered with silanol groups. The methyl red adsorption test is carried out by agitating in 25 milliliters of an anhydrous benzene solution containing 0.6 to 0.7 gram of the acid form of methyl red, paradimethylamino azobenzene orthocarboxylic acid, $$(CH_3)_2NC_6H_4N=NC_6H_4COOH$$

per liter, a suspension of a few tenths of a gram of the dried silica sample to be tested. No more than about 0.7 gram of this sample should be used in the test. Appreciably less must be used with voluminous samples, to avoid getting a mixture too thick to handle. Within the latter limitations, however, the amount of sample used should provide as near as possible a total available hydroxylated surface area of 10 square meters in the test. The test mixture is agitated for about two hours at about 25° C., to reach equilibrium conditions; a final concentration of about 400 milligrams of dye per liter in the solution after equilibration is necessary to insure saturation adsorption.

The decrease in dye concentration in the benzene solution is determined by adsorption spectrophotometric observations at 4750 A. of both the original and equilibrium benzene solutions of methyl red. The specific hydroxylated surface area in square meters per gram is calculated from the formula:

$S_d=$ 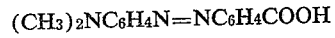

$$\frac{\text{grams dye adsorbed} \times 116 \times 10^{-20} \times \text{Avogadro's No.}}{\text{grams silica employed} \times \text{molecular weight of methyl red}}$$

where the covering power of each adsorbed methyl red molecule is approximately 1.16 square millimicrons.

*Specific depolymerization rate.*—Evidence has already been presented to demonstrate that the products of the invention are made up of dense amorphous silica. A further test which demonstrates that the silica is dense, i. e., non-porous, is the specific depolymerization rate, $K$. This is determined by treating the silica with 0.01 N sodium hydroxide solution at 30° C. and measuring the rate of monomer formation, i. e., the rate of depolymerization.

The specific depolymerization rate is defined as ten thousand times the rate of monomer formation per minute, divided by the specific surface area of the depolymerizing particles at the time of measurement of rate of monomer formation. Stated mathematically, $$K=\frac{10^4 \times (dm/dt)}{S_n(1-m)^{\frac{2}{2}}}$$

where $K$ is a specific depolymerization rate, $(dm/dt)$ is the rate of monomer formation per minute, $S_n$ is the original specific surface area of the silica tested, and $m$ is the fraction of total silica converted to monomer at the time, $t$.

The silica dissolved during depolymerization is measured with the molybdate reagent, as already described for the measurement of active silica. When the measurements are carried out on the dry silica powders of this invention, the procedure consists in washing with hot concentrated hydrochloric acid to remove any surface adsorbed metal ions, followed by small successive portions of distilled water, followed by acetone washing and drying at 110° C. Twenty milligrams of the dried powder are then accurately weighed and transferred to 100 milliliters of 0.01 N sodium hydroxide solution maintained at 30° C. The slurry is agitated vigorously by bubbling with nitrogen gas saturated with water vapor at 30° C. At appropriate intervals, determined by the rate of depolymerization, usually between 5 and 90 minutes, 5 milliliter aliquots are withdrawn from the depolymerizing solution and mixed with 45 milliliters of the freshly prepared molybdate reagent. The optical density measurements are made with the Beckman Spectrophotometer, as already described for the determination of active silica. The amount of monomer present at any time can be calculated from the optical density reading by comparison with the final color for complete depolymerization (100% monomer).

Six to eight monomer-time readings are taken during the time that approximately half the sample is depolymerized. Total silica is analyzed in the same manner as already described, by heating the solution to 90–100° C. until complete depolymerization of the sample has occurred, as is shown by the absence of variation between consecutive analyses.

From a knowledge of the time intervals at which the monomer concentrations were measured, and of the amount of silica present as monomer at these time intervals, a graph of the monomer concentration vs. time can be constructed. The per cent silica present as monomer is usually plotted as the ordinate, while the time in minutes is plotted as the abscissa. The slope of the line so obtained can then be used to calculate the rate of monomer formation per minute. The specific depolymerization rate, $K$, is then calculated as described above. The preferred products of this invention have a specific depolymerization rate of from 5 to 20, at a point where 30% of the silica has been depolymerized to monomer, i. e., $m=0.30$. Prior art products in which the silica is not dense due to the presence of tiny pores or imperfections in the ultimate units, may have $K$ values as high as 100. In the preferred products of this invention, the ultimate units and accreted silica are both dense.

*Refractive index.*—The products of this invention have refractive indices in the range of 1.42 to 1.48. The index of refraction of silica samples may be determined by suspending the silica in various liquids of known refractive index until a liquid is found in which the silica is practically invisible, indicating identical indices of refraction for the liquid and the silica.

The test may be carried out by suspending the silica in benzene (refractive index 1.5014), and adding heptane (refractive index 1.3867) to the suspension with stirring until the silica in the slurry becomes invisible. A sample of the supernatant mixed liquid is then removed by centrifugation, decantation or filtration, and the index of refraction of the liquid is determined with an Abbe Refractometer (see Gibb, Optical Methods of Chemical Analysis, McGraw-Hill Book Co., 1942, p. 326 ff.). The index of refraction of the silica is the same as that measured for the mixed liquid.

For those silicas having surface adsorbed metal ions, it is desirable to remove these adsorbed ions by washing the product with a 2N hydrochloric acid solution at 80° C., followed by washing with acetone and drying at 125° C. prior to measuring refractive index.

*Additional properties.*—The products of this invention, particularly those dried from organic solvents, may be obtained in the form of extremely light, fluffy powders. They may also be obtained in the form of lumps or cakes, which are readily pulverulent to such fine powders. By pulverulent is meant easily disintegrated by a slight mechanical shearing action, such as that obtained by rubbing between the fingers. The reinforced aggregates are so small that there is an absence of grittiness or abrasiveness in the powders.

The products of this invention may be either in the form of reinforced silica in a wet filter cake or a dried silica xerogel. As a wet cake, the products may be used as an intermediate in the preparation of other compositions and chemical modifications. In the dried form, the products are classed as xerogels. In order to demonstrate their character as xerogels, the products may be wetted with a solvent such as methanol, and dried without significant change in the basic structure of the material.

USES OF PRODUCTS

The dried products are useful as fillers for rubber and plastics, providing valuable modification of the properties of the resulting mixtures. They are highly effective thickening agents for greases. The products are also useful for thermal insulation, as carriers for insecticides, extenders for powdered materials, as catalysts, and in general, for uses in which a chemically stable, finely divided solid material is desired. The products of this invention have the advantage of being readily disintegrated to colloidal fragments by mechanical shearing action in a fluid or plastic medium.

EXAMPLES

The invention will be better understood by reference to the following illustrative examples.

Example 1

This is an example of a process of this invention wherein a reinforced silica in the form of a wet filter cake is produced: A 425-pound portion of a sodium silicate solution containing 2.39 grams $SiO_2$ per 100 milliliters of solution and having a molar $SiO_2:Na_2O$ ratio of 3.25:1 was charged to a 100-gallon steel tank equipped with a one-half horsepower, 400 R. P. M. "Lightnin" mixer driving a 10″ diameter, 3-bladed propeller. The silicate was heated to a temperature of $35\pm2°$ C. by steam injection. A sufficient amount (about 162 pounds) of a solution containing 2.40% $H_2SO_4$ was added uniformly over a period of about 30 minutes to bring the pH to $9.7\pm0.2$ as measured at 25° C. During this period, the temperature of the reacting mass was maintained below 40° C. The amount of acid added during this step of the process was equivalent to about 80% of the $Na_2O$ in the original sodium silicate. The sodium ion content remained below 0.3 N throughout the process. The clear sol thus obtained was heated to 95° C. in about 15 minutes. After heating, the sol contained discrete, ultimate, silica units which were about 5–7 millimicrons in diameter, and had a pH of about 10.1.

Solutions of sodium silicate and sulfuric acid were then added simultaneously at a uniform rate over a period of 2 hours through inlets located close to the vortex formed by the agitator. An 85.4-pound portion of the sodium silicate solution was used, which contained 13.22 grams of $SiO_2$ per 100 milliliters of solution and had a molar $SiO_2:Na_2O$ ratio of 3.25:1. The sulfuric acid was a 4.65% aqueous solution and was added in an amount to maintain the pH of the reaction mixture at $10.3\pm0.2$ as measured at 25° C. throughout the course of the reaction. Such an amount is sufficient to neutralize about 80% of the $Na_2O$ in the silicate solution and maintain the sodium ion concentration below 0.3 normal throughout the process. The temperature was maintained at 95° C. throughout the addition of acid and silicate.

During the heating of the initial sol, the tiny, discrete particles of the sol increase in size, and then during the initial addition of silicate and acid they become chemically bound together in the form of open networks or coherent aggregates of supercolloidal size, wherein the colloidal particles are present as dense ultimate units. The aggregates are precipitated. In the subsequent simultaneous addition of silicate and acid, the aggregates are reinforced. Since about 1 part of silica was added for each part of silica in the original sol, the build-up ratio on the aggregates was about 1:1.

Still maintaining a temperature of 95° C., the pH of the solution was adjusted from 10.3 to 5.0 by adding 4.65% sulfuric acid at a rate of about 0.24 gallons per minute for 20 minutes, and then adding small portions followed by repeated pH determinations, until the pH was 5 as measured at 25° C. This required about 32 pounds of the sulfuric acid solution.

The slurry thus obtained was then maintained at 85–95° C. without agitation for 4 hours, in order to further coagulate the precipitate to aid in filtration. The precipitate was filtered in several portions on a 50-gallon Nutsche, using nylon cloth as a filter medium. The filter cake was washed on the filter with 5 displacements of cold water, and then sucked as dry as possible. The final filter cake contained between 6 and 7% solids.

The finely divided, precipitated silica in this water wet filter cake is an example of the products of this invention. It consists of reinforced aggregates, as is evidenced by the fact that the coalescence factor of this silica is 45%. The product has a uniformity factor of 92%. Examination of the product with the electron microscope shows that it consists of coherent supercolloidal aggregates of spherical ultimate units which are about 10 millimicrons in diameter. The specific surface area of a dried sample is 337 m.$^2$/g. as determined by nitrogen adsorption, and 334 m.$^2$/g. as determined by dye adsorption. This silica of this product has a specific depolymerization rate constant of 13, indicating that the product is composed of dense silica. X-ray diffraction examination demonstrates that the silica is amorphous.

*Example 2*

The following is an example of a dry, finely divided xerogel of this invention dried from acetone: A sample of wet filter cake containing 7% solids was prepared in a similar manner to that in Example 1, except that the final slurry before filtration was treated with a mixture of lauryl and cetyl trimethylammonium bromide (0.2% based on the weight of the silica), in order to aid filtration. One part of the filter cake was slurried with about 5 parts of acetone. The slurry was allowed to stand for several hours at room temperature, and then filtered. The process of acetone washing was repeated seven times. This product was dried in an infra red oven, and finally in a forced hot-air oven at 120° C.

The resulting product was a white, fluffy, low-density product which has a specific surface area of 335 m.$^2$/g. as determined by nitrogen adsorption, a pH or 6.5 when slurried with 10 parts by weight of distilled water, a density of 0.119 gm./ml., as measured under a compressive load of 3 p. s. i., an oil absorption value of 476 ml./100 gm., i. e., 1.4 times the specific surface area, an SiO$_2$ content of 91.43%, a loss on ignition of 7.55 per cent, a non-siliceous ash of 1.01 per cent (mostly sodium sulfate), and a specific depolymerization rate constant of 13.

*Example 3*

This product is an example of a xerogel prepared by drying from xylene a sample of wet filter cake which was prepared in a similar manner to that of Example 1. One part of the filter cake (7% solids) was slurried with about 3 parts of acetone. The slurry was allowed to stand for several hours at room temperature, and then filtered. This process was repeated three times. The wet cake so obtained was slurried in 3 parts of xylene and then filtered. This product was dried at 175° C. in an ordinary hot-air oven.

The resulting product was a friable, low-density silica which had a specific surface area as measured by nitrogen adsorption of 33 m.$^2$/g. and an oil absorption of 436 ml./100 gm. which is 1.3 times the specific surface area. It had a coalescence factor of 50% and a uniformity factor of 88%.

This example illustrates that washing with a low boiling, water-miscible solvent, as for example, acetone, followed by washing with a second organic solvent, such as xylene, which has a boiling point higher than the boiling point of water is an efficient way to remove the water from a high-surface area product.

*Example 4*

The following is an example of a product of this invention which was obtained by dehydrating a water wet filter cake by azeotropic distillation from butyl acetate and drying from this organic liquid.

A sample of filter cake containing reinforced, supercolloidal aggregates of dense amorphous silica was prepared in a manner similar to Example 1. This filter cake was slurried with butyl acetate, and the water was removed from the mixture by azeotropic distillation. The excess butyl acetate was removed from the anhydrous slurry by filtration, followed by heating in a drying oven at 150° C.

The product, which was a fluffy, soft xerogel, had a density of 0.107 gm./ml., a specific surface area as measured by nitrogen adsorption of 325 m.$^2$/g., an oil absorption of 546 ml./100 gm., which is 1.7 times the specific surface area, a coalescence factor of 45%, and a uniformity factor of 90%.

*Example 5*

This is an example in which the reinforced xerogel product of this invention forms the internal structure of a surface-esterified silica product known as an estersil. (The estersil is disclosed and claimed in the co-pending United States application of R. K. Iler, Serial No. 171,759, filed July 1, 1950.)

The reinforced silica used in the preparation of the xerogel is made in a manner similar to that of Example 1. The wet filter cake so produced, containing 7% solids, is slurried in about 2 parts of n-butanol for each part of wet cake. The water is removed from this slurry by azeotropic distillation at atmospheric pressure; the liquid level in the distilling slurry is kept at a constant level by the addition of dry n-butanol. The water content in the alcohol phase is less than 0.20%, as determined by Fischer titration. This anhydrous slurry is heated to 300° C. for ½ hour in a stainless steel autoclave, cooled to room temperature, and the butanol removed by heating to about 120° C. in a vacuum oven for 24 hours.

The product is a hydrophobic, soft, fluffy, esterified silica xerogel. The fact that it is a xerogel can be demonstarted by wetting the product with methanol or butanol and drying by evaporation, as for example in a vacuum oven at 50° C. This can be done without significant change in the properties of the xerogel.

Samples prepared by the above process have the average properties as follows: Specific surface area as measured by nitrogen adsorption, of 280 m.$^2$/g., specific hydroxylated surface area as measured by dye adsorption of 0 m.$^2$/g., bulk density of 0.06 g./ml., and density under a compressive load of 3 p. s. i. of 0.10 g./ml. When the ester coating is removed, as for example by slowly heating the sample to 450° C. in a stream of air or oxygen, the resulting silica substrate powder has properties very similar to the product of Example 3, i. e., a nitrogen surface area of about 330 m.$^2$/g., a coalescence factor of about 50%, a uniformity of about 85%, and an oil absorption of about 490 ml./100 gm. sample, or 1.5 times the specific surface area in square meters per gram.

*Examples 6, 7, 8, and 9*

These examples show the effects of increasing build-up ratio; samples having build-up ratios of 0, 1, 2, and 4 are compared.

A solution of sodium silicate containing 25 g. of SiO$_2$ per liter and having an $SiO_2:Na_2O$ ratio of 3.25 was reacted with a sulfuric acid solution at room temperature (30° C.). The sulfuric acid solution was added uniformly over a 30-minute period, with vigorous mixing, and in such proportions that the final $SiO_2$ content of the solution was 20 g./liter, and the $SO_3:Na_2O$ ratio was 0.8, i. e., 80% of the available alkali in the silicate was neutralized. This is called the heel. Sample A was taken at this point.

The heel was heated to 95° C. and solutions of acid and silicate were then added separately but simultaneously, at uniform rates, over a 4-hour period. The silicate contained 40 g. of $SiO_2$/liter and had an $SiO_2:Na_2O$ ratio of 3.25. The sulfuric acid concentration was regulated so that the silica content in the mixture was maintained at 20 g. $SiO_2$/liter and the pH at about 10. The rate of addition of silicate was adjusted so that the build-up rate was 1, i. e., 1 part of silica was added per hour for each part of silica in the heel. Soon after the beginning of build-up, the ultimate silica units in the heel aggregated and thereafter accretion occurred on reticulated silica. Samples were taken as follows: B after a build-up ratio of 1, C after a build-up ratio of 2, and D after a build-up ratio of 4.

These samples were treated as follows: An equimolar mixture of cetyl and lauryl trimethylammonium bromide, in amounts equal to 0.2% based on the weight of the silica, was added as a dilute solution, in order to coagulate the silica and act as an aid in filtration. The pH of the slurry was adjusted to 5.5, the slurry was filtered, the silica wet cake washed with water, and the filter cake finally slurried in n-butanol and dehydrated by azeotropic distillation. The resulting n-butanol slurries were dried by evaporating the butanol in an oven at 150° C. The properties of the products are listed in the following table:

| Example | Sample | Build-up Ratio | Surface Area by Nitrogen, m.²/g. | Density at 3 p. s. i. | Remarks |
|---|---|---|---|---|---|
| 6 | A | 0 | 567 | 0.300 | Gritty, nondispersible powder. |
| 7 | B | 1 | 317 | 0.098 | Fluffy, readily dispersible powder. |
| 8 | C | 2 | 284 | 0.124 | Do. |
| 9 | D | 4 | 213 | 0.185 | Do. |

Products of Examples 7, 8, and 9 were found to thicken Mid-Continent solvent-treated oil having a viscosity of 3000 SUS, to form a grease at about 15% solids and 85% oil, whereas the product of Example 6 could only be dispersed after very severe milling, and require a much higher concentration before a grease was formed. It is thus evident that build-up on silica aggregates imparts valuable properties to the resulting reinforced, reticulated structures.

*Example 10*

This example is similar to Example 1, except that carbon dioxide gas was used instead of sulfuric acid. The reinforced silica product obtained as a wet filter cake was recovered by replacing the water in the filter cake by displacement washing and drying from ether.

Carbon dioxide gas was bubbled into a solution of sodium silicate containing 15 grams of $SiO_2$ and 4.6 grams of $Na_2O$ per liter ($SiO_2:Na_2O$ mole ratio=3.36) at such a rate that after one-half hour the $CO_2:Na_2O$ mole ratio was 1.2. The temperature during this treatment was 40° C. and the pH dropped from 11.2 to about 10. The product was in the form of colloidal silica particles dispersed in the water to yield a colloidal sol.

This sol was heated to 95° C. While in this temperature range, a solution of sodium silicate (containing 50 grams $SiO_2$ and 15.4 grams $Na_2O$ per liter and corresponding to an $SiO_2:Na_2O$ mole ratio of 3.36) and $CO_2$ gas were added simultaneously but separately over a period of 2 hours at a controlled uniform rate, and with vigorous agitation, such that 1 part of $SiO_2$ was added for each part of $SiO_2$ originally present in the sol, and the final concentration was 23 grams of $SiO_2$ per liter. The rate of addition of $CO_2$ was so adjusted that a $CO_2:Na_2O$ mole ratio of 1.2 was maintained at all times, with consequent maintenance of the pH in the region of 10. After about ½ of the reagents had been added, coagulation occurred, forming a silica gel. Thereafter, the specific surface area of the precipitated silica present continuously decreased. The slurry obtained after all of the reagents had been added was filtered and washed, and the filter cake was reslurried in water and adjusted to about pH=7 with 8 normal sulfuric acid. This slurry was then filtered, washed with water, washed exhaustively with absolute methanol, followed by a wash with ether, all at room temperature. The resulting product was dried in air, first at room temperature and then at about 100° C. The product was a soft, light, fluffy powder with a bulk density of about 0.1 gram per cc. at atmospheric pressure.

The dried powder had a specific surface area of 270 square meters per gram, as determined by nitrogen adsorption.

*Example 11*

A silica sol is prepared in the following manner: A solution of sodium silicate, having an $SiO_2:Na_2O$ mole ratio of 3.36, and containing 3.64 grams of $SiO_2$ per 100 milliliters, is heated to 95° C. To this hot solution a sulfuric acid solution is added over a period of ½ hour, at a uniform rate, and with vigorous agitation. The volume of sulfuric acid solution is so adjusted that at the end of ½ hour the $SiO_2$ concentration in the solution is 3.3, and the concentration of sulfuric acid is regulated so that 80% of the $Na_2O$ originally present in the sodium silicate solution is neutralized, i. e., the final $SO_3:Na_2O$ mole ratio in the solution is equal to 0.8. In this manner a silica sol is prepared, the particles of which are about 15 millimicrons in diameter, and the pH of the sol being about 10. Hereinafter a silica sol prepared in the above manner will be referred to as the "heel."

To a heel prepared in this manner a sodium silicate ($SiO_2:Na_2O$ mole ratio=3.36) solution and a sulfuric acid solution are added simultaneously but separately with vigorous agitation, and while maintaining a temperature of 95° C. The quantity of sodium silicate solution added is such that over a two-hour period two parts of $SiO_2$ are added for each part of $SiO_2$ originally present in the heel. The concentration of the sodium silicate solution added during this build-up process is about 6.6 grams of $SiO_2$ per 100 milliliters. The volume of sulfuric acid solution used is such that the concentration of $SiO_2$ in the silica sol or slurry is 3.3 grams of $SiO_2$ per 100 milliliters, this concentration being maintained throughout the preparation. Moreover, the concentration of sulfuric acid is regulated so that at all times the ratio of $SiO_2$ to $Na_2O$ in the solution is 0.8, i. e., a pH of about 10 is maintained. Early in the build-up process the particles of silica present in the heel start to precipitate.

The final slurry is filtered, the wet filter cake is reslurried in water, and coagulated with 0.2% by weight (based on $SiO_2$) of a mixture of equimolar proportions of cetyl and lauryl trimethyl ammonium bromide. The pH is adjusted to about 8 with 4 molar sulfuric acid, the reslurry is filtered, washed, and the cake is then dried.

The dried powder consists of particles having a diameter of approximately 22 to 25 millimicrons as determined by electron micrograph, a hydroxylated surface area of approximately 100 square meters per gram as measured by methyl red adsorption, and a slurry pH between 7.0 and 9.0 in distilled water.

Example 12

This an example of a process of the invention in which carbon dioxide ($CO_2$) is used as the acid, and in which there is a considerable amount of build-up on the product after coagulation has taken place.

A silica sol was prepared in the following manner: Aqueous sodium silicate solution, containing 35 grams of $SiO_2$ per liter of solution and having an $SiO_2:Na_2O$ mol ratio of 3.36, was heated to about 95° C. To this heated sodium silicate solution there was added over a period of about 40 minutes, and at a uniform rate, enough acid in the form of carbon dioxide gas, so that at the end of a 40-minute period the $CO_2:Na_2O$ mol ratio was 1.2. The pH of the resulting sol was about 10, and the particle size of the ultimate units or particles, as determined from an electron micrograph, was about 16 millimicrons. This sol will hereafter be referred to as the "heel."

To the heel, carbon dioxide gas and a sodium silicate solution containing 35 grams of $SiO_2$/liter and having an $SiO_2:Na_2O$ mol ratio of 3.36 were added simultaneously, but separately, and with very vigorous agitation, while maintaining a temperature of about 95° C. The amount of sodium silicate solution added was such that the build-up ratio was 4; in other words, 4 parts of active $SiO_2$ was added in the feed solution for each 1 part of $SiO_2$ originally present in the heel. A build-up rate of 1.33 was used; that is, the feed solution was added over a period of three hours. This rate was kept constant during the entire addition procedure. $CO_2$ gas was added at such a rate that a $CO_2:Na_2O$ mol ratio of approximately 1.2 was maintained during the entire procedure. Frequent pH measurements were taken on samples cooled to 25° C. and the pH range was found to be within the range from 9.95 to 10.25. The final pH of the resulting slurry was 10.19.

Soon after build-up was started, a coagulation of silica nuclei occurred. Thus, during most of the three-hour period during which active silica was introduced there were present in the solution coagulated particles. These particles were the nuclei for the build-up of the reticulated product. The diameter of the ultimate units was 26.3 millimicrons; thus the coat around the reticulated particles was of the order of 4–5 millimicrons in thickness.

The resulting slurry of fine silica aggregates was filtered, the silica being recovered in the precipitate. The precipitate was then reslurried in water to give an $SiO_2$ concentration of about 8%. The pH of this slurry was adjusted downward with about 8.0 N sulfuric acid to a pH of 8.0. After pH adjustment, the reslurry was filtered and the precipitated reticulated silica product was dried at 110° C. for approximately eight hours.

The product was characterized as follows: The number average particle diameter (i. e., the diameter of the ultimate units) as determined from electron micrograph was 26.3 millimicrons. The surface area average diameter, also as determined by electron micrograph, was 32.4 millimicrons. The specific surface area of this product, as determined from the surface area average diameter from micrographs, was 84.0 square meters per gram. The specific surface area as determined by nitrogen adsorption was 60.3 square meters per gram. It will be noted that the calculated specific surface area is larger than the observed specific surface area. This is due to the fact that the ultimate units have been cemented or grown together into reticulated particles, with a resulting loss of surface area. This growing together, as confirmed by the calculated and observed specific surface areas, is a measure of reticulation, the reticulation factor being 1.39. The sample had a coalescence factor of 70% and a uniformity factor of 78%.

The pH of 2 grams of this xerogel when slurried in 20 ml. of distilled water was found to be 9.65. Chemical analysis of the dried powder was as follows: 90.3% $SiO_2$, 2.58% non-siliceous ash total, 1.21% Na, 6.74% loss on ignition.

This material was milled into rubber at 20 volume loading, and with the following compounding formula:

| | Parts by weight |
|---|---|
| Smoked sheet | 100.0 |
| Stearic acid | 1.0 |
| Neozone A (antioxidant) | 1.0 |
| Zinc oxide | 5.0 |
| Sulfur | 3.0 |
| Benzothiazyl disulfide (accelerator) (MBTS) | 1.0 |
| Tetramethyl thiuram disulfide (accelerator) | 0.25 |
| Reticulated silica | 41.0 |

The resulting stock, after curing, was found to have the following properties: tensile strength of 4,240 lbs./sq. in., 580% elongation at break, a hardness of 60 (Shore), a tear strength of 500 lbs./sq. in., and a modulus of 1370 at 300% elongation.

The high modulus figure is a result of the high reticulation factor. The excellent tear and tensile results indicate that the product was readily dispersed.

Example 13

This is an example of a process of the invention in which a sol having silica particles of the order of 20 millimicrons in diameter is neutralized with sulfuric acid to about pH 7. The sol is allowed to stand at this pH and at room temperature for about 24 hours, during which time coagulation occurs. After build-up on this coagulated product, a reticulated type of fine silica is the product.

A sodium silicate solution containing 40 grams of $SiO_2$ per liter and having an $SiO_2:Na_2O$ mol ratio of 3.36 was heated to about 95° C. To this hot solution was added, with very vigorous agitation, a solution of sulfuric acid over a period of two hours. The sulfuric acid solution added was about 4.7% $H_2SO_4$; one volume of this sulfuric acid solution was added for each three volumes of sodium silicate solution originally present. The $SO_3:Na_2O$ mol ratio in the resulting solution was about 0.80. The pH of the final solution was about 10.40. Electron micrographs of the silica sol showed that the average particle diameter of the fine silica particles present in the sol was about 21 millimicrons.

Ten liters of the sol prepared as described above, having an $SiO_2$ content of about 30 grams/liter, was adjusted to pH 6.50 by the addition of 8-normal sulfuric acid. The resulting sol was allowed to stand for 16 hours at 30° C. The product was a coagulated, jelly-like mass. This was vigorously stirred, and heated to 95° C.

To this suspension active silica was added by adding the following solutions: Starting with 0 time and continuing for four hours thereafter there was added 7 liters of a sodium silicate solution containing 600 grams of $SiO_2$ in the total volume and having an $SiO_2:Na_2O$ mol ratio of 3.36. Simultaneously there was added (also starting at 0 time, but continuing only for two hours) 4 liters of water at the rate of 2 liters per hour. Starting at one hour and continuing to the end of the four-hour period there was added 6 liters of 3.6% $H_2SO_4$ solution at the rate of 2 liters per hour. The pH at 0 time was about 6.5, and after one hour, the point at which the sulfuric acid feed was started, was 10.65. The final pH of the resulting slurry was 10.58. The $SO_3:Na_2O$ mol ratio in the final solution was about 0.80. During the entire process the temperature was maintained above 90° C.

The precipitated silica in the final slurry was filtered off, washed with water, the wet cake reslurried in water, and the pH of the reslurry adjusted to about 6.5 with dilute $H_2SO_4$. This slurry was then filtered, washed, and the wet cake dried at 110° C.

The dried silica powder consisted of aggregates of ultimate units about 25 millimicrons in diameter, had a surface area by dye adsorption of 65 m.²/g., and gave a pH of about 8.2 when slurried in distilled water.

This material was milled into rubber at 20 volume loading, using the compounding formula of Example 12. The resulting stock, after curing, was found to have the following properties: A tensile strength of 3810 p. s. i., tear strength of 290 p. s. i., modulus of 1235 p. s. i. at 300% elongation, hardness of 53, elongation of 595% at break.

*Example 14*

This is an example of a process of the invention in which coagulation is caused by increasing the sodium ion concentration from 0.3 N to 0.4 N, during the course of build-up.

A "heel" of silica sol was prepared in the following manner:

Two and one-half liters of a sodium silicate solution containing 48 grams of $SiO_2$ per liter and having an $SiO_2:Na_2O$ mol ratio of 3.36 was heated to 95° C. To this sodium silicate solution heated to 95° C. there was added over a period of ½ hour, 1½ liters of a 3.3% sulfuric acid solution. At the end of this ½ hour, the $SO_3:Na_2O$ mol ratio in the solution was 0.85. The pH of the sol was 9.94.

Using the 'heel' prepared as described above, "build up" was accomplished by adding simultaneously but separately, at uniform rates and with very vigorous stirring, while maintaining a temperature above 90° C. a sodium silicate solution containing 80 grams of $SiO_2$ per liter and having an $SiO_2:Na_2O$ mol ratio of 3.36 and a 3.3% sulfuric acid solution. The additions were continued for a period of 4 hours, during which time 6 liters of sulfuric acid solution and 6 liters of sodium silicate solution were added. The final pH of the resulting slurry was 10.45. Coagulation occurred about 1 hour after the beginning of "build up," that is after the beginning of the simultaneous addition of sulfuric acid and sodium silicate solution to the "heel." Thus, during three-fourths of the "build-up" period, a precipitate or coagulate was present in the reaction medium and a reticulated product was thereby prepared by building around or onto the aggregates in the precipitate. The final slurry was filtered, the filtered cake was reslurried in about 6 liters of tap water, and the pH of this reslurry was adjusted to 8.0 with 8 normal sulfuric acid. The resulting slurry was filtered. The precipitate was dried at about 110° C. for a period of several hours, and the resulting powder was ground to pass a 200-mesh screen. The pH of a slurry formed by suspending 2 grams of this material in 20 milliliters of distilled water was 9.15.

The resulting fine silica was characterized as follows:

By electron micrographs the number average particle diameter was determined to be 22.00 millimicrons, and the surface area average diameter 27.0 millimicrons. From the latter figure the surface area was calculated to be 101 square meters per gram. By the nitrogen adsorption technique the experimental surface area was found to be 79.8 square meters per gram. It will be noted that the calculated surface area is larger than the observed. This indicates that reticulation is present in the final product, resulting in an apparent loss of surface area, due to the fact the particles have grown together in a reticulated mass. The reticulation factor, $S_c/S_n$, was 1.26.

A portion of the fine silica was milled into rubber, using the compounding formula of Example 12. The resulting rubber stock at 20 volume loading had the following characteristics after curing: A tensile strength of 4020, tear strength of 400, modulus 1320, hardness 58, elongation 580.

*Example 15*

This is an example of the product of the invention which has outstanding properties when used as a reinforcing rubber filler.

The reaction is carried out in an 80-gallon insulated, mild steel tank, equipped with an internal steam heating coil and a steam injection nozzle. A centrifugal circulating pump of 20-gallon per minute capacity is connected to the reactor, in such a manner that the reaction slurry is circulated through a pipeline from the bottom of the reactor and introduced back in the top. Acid and silicate feed streams are introduced in this line on the intake side of the pump, to take advantage of the mixing action in the pump. A "Lightnin" mixer of ¼ H. P. motor is used inside the reactor as further mixing medium. Temperature is controlled by means of an electronic controller which will regulate the temperature ±0.7° C. A side stream is diverted through a heat exchanger to cool the solution to 25° C. for pH measurement. The pH is taken with the Beckman pH meter. Rotameters are introduced in the feed lines so that the rate of addition of acid and silicate can be regulated at all times.

A 14.9-pound portion of a commercia sodium silicate solution known as "JM Brand" containing 29.6% $SiO_2$ and having an $SiO_2:Na_2O$ ratio of 3.25, is mixed with 108 pounds of water to give a solution containing 3.71 grams of $SiO_2$ per 100 grams of solution. A 1.38-pound portion of 98% $H_2SO_4$ is mixed with 8.7 pounds of water to give 12.95% $H_2SO_4$ solution. This acid solution is made up in a separate tank. The sodium silicate is heated to a temperature of 90° C. with a steam coil, and then to 95° C. by means of steam injection. At this point, the acid solution is added at a uniform rate to bring the pH of the heel to 10.5 in 30 minutes.

The build-up solutions are prepared as follows: (a) Sulfuric acid solution containing 3.5 pounds of 98% $H_2SO_4$ is added to 107.5 pounds of water to give a 3.11% $H_2SO_4$ solution. (b) Sodium silicate solution is prepared by diluting 29.8 pounds of JM Brand sodium silicate with 89.5 pounds of water to give a solution containing 7.95 grams of $SiO_2$ per 100 grams of solution.

Five minutes after the completion of the first addition of acid to silicate, the two build-up solutions are added separately, but simultaineously, to the pipeline on the intake side of the pump. Build-up silicate and acid are added at a uniform rate, so that build-up is complete in 120 minutes. During this process, the pH is maintained at 10.5±0.1. Temperature is maintained at 95° C.

At the end of the build-up time, a solution of 3.11% $H_2SO_4$ is added to the reactor in order to reduce the pH to 7. This is done over a period of 30 minutes and at a temperature of 95° C.

In order to aid filtration, a 1% solution of cetyl trimethylammonium bromide is added. About 0.03 pound of this compound are added to the reaction mixture over a period of 10 minutes.

The reaction slury is filtered on a continuous vacuum filter. The wet cake is washed until the salt content is below 5%. The pH of the wet cake is then adjusted to 8, and the wet cake is then dried in an oven in which the air is circulating at a temperature of 110° C. The drying process requires about 48 hours.

The sample is then pulverized to pass 100 mesh.

The xerogel obtained in this way has a bulk density as measured in an open graduate of 0.22 gram per cc., surface area by nitrogen adsorption of 132 m.²/g., a coalescence factor of 60%, a uniformity of 91%, an oil absorption of 207 ml./100 gm. or 1.6 times the specific surface area, and a refractive index of 1.45. When milled into rubber, using a formulation similar to that used in Example 12, except at 30 volume loading, and with 5 parts of MBTS accelerator, the silica gives the following properties: 300% modulus—2027 p. s. i., tensile strength—4267 p. s. i., per cent elongation at break—560%, tear strength—967 pounds per inch, Shore hardness—78.

The excellent tear and tensile values indicate that this product is readily dispersible in rubber.

We claim:

1. In a process in which silica is caused to accrete to aggregates larger than colloidal size, having reticulated structures of open-packed, dense, amorphous silica spheroids which are from 5 to 150 millimicrons in diameter, the step comprising mixing active silica with an aqueous suspension of the aggregates while maintaining the pH of the suspension at 8 to 11, the alkali metal ion concentration below 1 normal, and the temperature from 60 to 125° C., the rate of supplying active silica to the mixture being sufficiently slow that the specific surface area of the insoluble silica in the mixture decreases during said addition.

2. In a process in which silica is caused to accrete to aggregates larger than colloidal size, having reticulated structures of open-packed, dense, amorphous silica spheroids which are from 5 to 150 millimicrons in diameter, the steps comprising mixing active silica with an aqueous suspension of the aggregates while maintaining the pH of the suspension at 8 to 11, the alkali metal ion concentration below 1 normal, and the temperature from 60 to 125° C., the rate of supplying active silica to the mixture being sufficiently slow that the specific surface area of the insoluble silica in the mixture decreases during said addition, and replacing water as the liquid phase in the product with an organic liquid having a surface tension lower than that of water.

3. In a process in which silica is caused to accrete to aggregates larger than colloidal size, having reticulated structures of open-packed, dense, amorphous silica spheroids which are from 5 to 150 millimicrons in diameter, the steps comprising mixing active silica with an aqueous suspension of the aggregates while maintaining the pH of the suspension at 8 to 11, the alkali metal ion concentration below 1 normal and the temperature from 60 to 125° C., the rate of supplying active silica to the mixture being sufficiently slow that the specific surface area of the insoluble silica in the mixture decreases during said addition, removing water from the product by adding an organic liquid which forms an azeotrope with water and distilling out the water azeotropically, and thereafter drying the product by evaporating off the organic liquid.

4. In a process in which active silica is caused to accrete to silica gel, the step comprising mixing active silica with an aqueous suspension of the gel while maintaining the pH of the suspension at 8 to 11, the alkali metal ion concentration below 1 normal, and the temperature from 60 to 125° C., the rate of supplying active silica to the mixture being sufficiently slow that the specific surface area of the insoluble silica in the mixture decreases during said addition.

5. In a process in which active silica is caused to accrete to silica gel, the steps comprising mixing active silica with an aqueous suspension of the gel while maintaining the pH of the suspension at 8 to 11, the alkali metal ion concentration below 1 normal, and the temperature from 60 to 125° C., the rate of supplying active silica to the mixture being sufficiently slow that the specific surface area of the insoluble silica in the mixture decreases during said addition, and replacing water as the liquid phase in the product with an organic liquid having a surface tension lower than that of water.

6. In a process in which active silica is caused to accrete to silica gel, the steps comprising mixing active silica with an aqueous suspension of the gel while maintaining the pH of the suspension at 8 to 11, the alkali metal ion concentration below 1 normal, and the temperature from 60 to 125° C., the rate of supplying active silica to the mixture being sufficiently slow that the specific surface area of the insoluble silica in the mixture decreases during said addition, removing water from the product by adding an organic liquid which forms an azeotrope with water and distilling out the water azeotropically, and thereafter drying the product by evaporating off the organic liquid.

7. In a process for producing reinforced, reticulated silica products the steps comprising mixing an aqueous dispersion of active silica with a suspension of aggregates larger than colloidal size, having reticulated structures of open-packed, amorphous, dense colloidal silica spheroids, which are greater than 5 millimicrons in diameter, and heating the mixture to from 60 to 125° C. at a pH of 8 to 11, whereby the active silica accretes to the aggregates.

8. In a process for producing reinforced, reticulated silica products the steps comprising partially neutralizing a sodium silicate with an acid at a pH of 8 to 11 to form an aqueous dispersion of active silica, mixing this aqueous dispersion with a suspension of aggregates larger than colloidal size, having reticulated structures of open-packed, amorphous, dense colloidal silica spheroids which are greater than 5 millimicrons in diameter, and heating the mixture to from 60 to 125° C. at a pH of 8 to 11, whereby the active silica accretes to the aggregates.

9. In a process for producing reinforced, reticulated silica products the steps comprising forming an aqueous suspension of aggregates larger than colloidal size, having reticulated structures of open-packed, amorphous, dense colloidal silica spheroids which are greater than 5 millimicrons in diameter, adding sodium silicate and an acid simultaneously, while agitating the suspension, at such rate that the pH of the suspension is maintained at 8 to 11, whereby active silica is liberated, and heating the mixture to from 60 to 125° C., whereby the active silica accretes to the aggregates.

10. In a process for producing reinforced, reticulated silica products the steps comprising adding sodium silicate and an acid simultaneously, with agitation, to an aqueous suspension of aggregates larger than colloidal size, having reticulated structures of open-packed, amorphous, dense colloidal silica spheroids which are greater than 5 millimicrons in diameter, the relative rates of silicate and acid addition being such that the pH of the suspension is maintained at 8 to 11, while heating the reaction mixture to a temperature from 60 to 125° C., whereby active silica is liberated and accretes to the aggregates.

11. In a process for producing reinforced, reticulated silica products the steps comprising adding sodium silicate and an acid simultaneously, with agitation, to an aqueous suspension of aggregates larger than colloidal size, having reticulated structures of open-packed, amorphous, dense silica spheroids which are from 5 to 150 millimicrons in diameter, the relative rates of silicate and acid addition being such that the pH of the dispersion is maintained at 8 to 11, while heating the reaction mixture to a temperature from 60 to 125° C., whereby active silica is liberated and accretes to the aggregates, and continuing the addition of sodium silicate and acid until the coalescence factor of the accreted aggregates is from 30 to 80%.

12. In a process for producing reinforced, reticulated silica products the steps comprising adding sodium silicate and an acid simultaneously, with agitation, to an aqueous suspension of aggregates larger than colloidal size, having reticulated structures of open-packed, amorphous, dense silica spheroids, the spheroids having a surface area equivalent to that of the same weight of discrete silica spheres from 5 to 50 millimicrons in diameter, the relative rates of silicate and acid addition being such that the pH of the suspension is maintained at about from 8 to 11, the sodium ion normality being about from 0.1 to 0.4 normal, and the silicate and acid being added at such a rate that 1.5 parts by weight of active silica are added per hour for each part of silica already present as aggregates, while heating the mixture to a temperature of about from 95 to 125° C., whereby active silica is liberated and accretes to the aggregates, and continuing the addition of sodium silicate and acid until the coalescence factor of the accreted aggregates is from 30 to 80%.

13. In a process for producing reinforced, reticulated silica products the steps comprising adding sodium silicate and an acid simultaneously, with agitation, to an aqueous suspension of aggregates larger than colloidal size, having reticulated structures of open-packed, amorphous, dense silica spheroids, the spheroids having a surface area equivalent to that of the same weight of discrete silica spheres from 5 to 15 millimicrons in diameter, the relative rates of silica and acid addition being such that the pH of the suspension is maintained at about from 8 to 11, the sodium ion normality being about from 0.1 to 0.4 normal, and the silicate and acid being added at such a rate that 1.5 parts by weight of active silica are added per hour for each part of silica already present as aggregates, while heating the mixture to a temperature of about 95° C., whereby active silica is liberated and accretes to the aggregates, and continuing the addition of sodium silicate and acid until the coalescence factor of the accreted aggregates is from 30 to 80%.

14. In a process for producing reinforced, reticulated silica products the steps comprising adding sodium silicate and sulfuric acid simultaneously, with agitation, to an aqueous suspension of aggregates larger than colloidal size, having reticulated structures of open-packed, amorphous, dense silica spheroids, the spheroids having a surface area no greater than equivalent to that of the same weight of 15 millimicron diameter discrete silica spheres, the relative rates of silicate and acid addition being such that the pH of the suspension is maintained at about 10, the sodium ion normality being about 0.3 to 0.4, and the silicate and acid being added at such a rate that 1.5 parts by weight of active silica are added per hour for each part of silica already present as aggregates, while heating the reaction mixture to a temperature of about 95° C., whereby active silica is liberated and accretes to the aggregates, and continuing the addition of sodium silicate and acid until the ratio of the specific surface area calculated from electron micrograph measurements of the accreted silica aggregates to the specific surface area as measured by nitrogen adsorption on the accreted aggregates is at least 1.1.

15. In a process for producing reinforced, reticulated silica products the steps comprising adding sodium silicate and carbonic acid simultaneously, with agitation, to an aqueous suspension of aggregates larger than colloidal size, having reticulated structures of open-packed, amorphous, dense silica spheroids, the spheroids having a surface area equivalent to that of the same weight of 20 millimicron diameter discrete silica spheres, the relative rates of silicate and acid addition being such that the pH of the suspension is maintained at about 10, the sodium ion normality being about 0.3 to 0.4, and the silicate and acid being added at such a rate that 1.5 parts by weight of active silica are added per hour for each part of silica already present as aggregates, while heating the reaction mixture to a temperature of about 95° C., whereby active silica is liberated and accretes to the aggregates, and continuing the addition of sodium silicate and acid until the ratio of the specific surface area calculated from electron micrograph measurements of the accreted silica aggregates to the specific surface area as measured by nitrogen adsorption on the accreted aggregates is at least 1.1.

16. In a process for producing reinforced, reticulated silica products the steps comprising adding sodium silicate and hydrochloric acid simultaneously, with agitation, to an aqueous suspension of aggregates larger than colloidal size, having reticulated structures of open-packed, amorphous, dense silica spheroids, the spheroids having a surface area equivalent to that of the same weight of 20 millimicron diameter discrete silica spheres, the relative rates of silicate and acid addition being such that the pH of the suspension is maintained at about 10, the sodium ion normality being about 0.3 to 0.4, and the silicate and acid being added at such a rate that 1.5 parts by weight of active silica are added per hour for each part of silica already present as aggregates, while heating the reaction mixture to a temperature of about 95° C., whereby active silica is liberated and accretes to the aggregates, and continuing the addition of sodium silicate and acid until the ratio of the specific surface area calculated from electron micrograph measurements of the accreted silica aggregates to the specific surface area as measured by nitrogen adsorption on the accreted aggregates is at least 1.1.

17. In a process in which silica is caused to accrete to aggregates larger than colloidal size, having reticulated structures of open-packed, dense, silica spheroids which are from 15 to 150 millimicrons in diameter, the steps comprising mixing active silica with an aqueous suspension of the aggregates while maintaining the pH of the suspension at 8 to 11, the alkali metal ion concentration below 1 normal, and the temperature from 60 to 125° C., the rate of supplying active silica to the mixture being sufficiently slow that the specific surface area of the precipitated silica present decreases, separating the precipitated silica from the aqueous suspension, washing it substantially free of occluded salts, adjusting the pH to below about 8.5, and drying the product.

18. A finely divided silica composition in the form of aggregates larger than colloidal size, having a specific surface area of from 60 to 400 square meters per gram and consisting of dense, substantially uniform-sized, amorphous silica spheroids, joined together into open-packed, reticulated structures, the structures being uniformly reinforced with dense, amorphous silica and being so openly packed that, when dried, their oil absorption in milliliters per 100 grams of solid is from 1 to 3 times the specific surface area in square meters per gram.

19. A pulverulent, dry silica xerogel composition in the form of aggregates larger than colloidal size, having a specific surface area of from 60 to 400 square meters per gram and consisting of dense, substantially uniform-sized, amorphous silica spheroids, joined together into open-packed, reticulated structures, the structures being uniformly reinforced with dense, amorphous silica and being so openly packed that the oil absorption in milliliters per 100 grams of solid is from 1 to 3 times the specific surface area in square meters per gram.

20. A pulverulent, dry silica xerogel composition in the form of aggregates larger than colloidal size, having a specific surface area of from 60 to 400 square meters per gram and consisting of dense, substantially uniform-sized, amorphous silica spheroids, joined together into open-packed, reticulated structures, the structures being uniformly reinforced with dense, amorphous silica, being so openly packed that the oil absorption in milliliters per 100 grams of solid is from 1 to 3 times the specific surface area in square meters per gram, and being reinforced to such an extent that the coalescence factor is from 30 to 80%.

21. A pulverulent, dry silica xerogel composition in the form of aggregates larger than colloidal size, having a specific surface area of from 60 to 400 square meters per gram and consisting of dense, substantially uniform-sized, amorphous silica spheroids, joined together into open-packed, reticulated structures, the structures being uniformly reinforced with dense, amorphous silica, being so openly packed that the oil absorption in milliliters per 100 grams of solid is from 1 to 3 times the specific surface area in square meters per gram, being reinforced to such an extent that the coalescence factor is from 30 to 80%, and the silica structures having a uniformity factor of greater than 75%.

22. A pulverulent, dry silica gel composition in the form of aggregates larger than colloidal size, having a specific surface area of from 60 to 200 square meters per gram and consisting of dense, substantially uniform-sized, amorphous silica spheroids, joined together into open-packed, reticulated structures, the structures being uniformly reinforced with dense, amorphous silica the ratio of the specific surface area calculated from electron micrograph measurements of the accreted silica aggregates to the specific surface area as measured by nitrogen adsorption on the accreted aggregates being at least 1.1.

23. A pulverulent, dry silica xerogel composition in the form of aggregates larger than colloidal size, having a specific surface area of from 60 to 200 square meters per gram and consisting of dense, substantially uniform-sized, amorphous silica spheroids, joined together into open-packed, reticulated structures, the structures being uniformly reinforced with dense, amorphous silica, being so openly packed that the oil absorption in milliliters per 100 grams of solid is from 1 to 3 times the specific surface area in square meters per gram, being reinforced to such an extent that the coalescence factor is from 30 to 80%, the ratio of the specific surface area calculated from electron micrograph measurements of the accreted silica aggregates to the specific surface area as measured by nitrogen adsorption on the accreted aggregates being at least 1.1.

24. A pulverulent, dry silica xerogel composition in the form of aggregates larger than colloidal size, having a specific surface area of from 60 to 200 square meters per gram and consisting of dense, amorphous silica spheroids joined together into open-packed, reticulated structures, the structures being uniformly reinforced with dense, amorphous silica, being so openly packed that the oil absorption in milliliters per 100 grams of solid is from 1 to 3 times the specific surface area in square meters per gram, being reinforced to such an extent that the coalescence factor is from 30 to 80%, and a uniformity factor greater than 75%, the ratio of the specific surface area calculated from electron micrograph measurements of the accreted silica aggregates to the specific surface area as measured by nitrogen adsorption on the accreted aggregates being at least 1.1.

25. A pulverulent, dry silica xerogel composition in the form of aggregates larger than colloidal size, having a specific surface area of from 200 to 400 square meters per gram and consisting of dense, substantially uniform-sized, amorphous silica spheroids, joined together into open-packed, reticulated structures, the structures being uniformly reinforced with dense, amorphous silica and being so openly packed that the oil absorption in milliliters per 100 grams of solid is from 1 to 3 times the specific surface area in square meters per gram.

26. A pulverulent, dry silica xerogel composition in the form of aggregates larger than colloidal size, having a specific surface area of from 200 to 400 square meters per gram and consisting of dense, substantially uniform-sized, amorphous silica spheroids, joined together into open-packed, reticulated structures, the structures being uniformly reinforced with dense, amorphous silica, being so openly packed that the oil absorption in milliliters per 100 grams of solid is from 1 to 3 times the specific surface area in square meters per gram, and being reinforced to such an extent that the coalescence factor is from 30 to 80%.

27. A pulverulent, dry silica xerogel composition in the form of aggregates larger than colloidal size, having a specific surface area of from 200 to 400 square meters per gram and consisting of dense, substantially uniform-sized, amorphous silica spheroids, joined together into open-packed, reticulated structures, the structures being uniformly reinforced with dense, amorphous silica, being so openly packed that the oil absorption in milliliters per 100 grams of solid is from 1 to 3 times the specific surface area in square meters per gram, and being reinforced to such an extent that the coalescence factor is from 30 to 80%, and the structures having a uniformity factor of greater than 75%.

References Cited in the file of this patent

UNITED STATES PATENTS

| | | |
|---|---|---|
| 2,093,454 | Kistler | Sept. 21, 1937 |
| 2,496,736 | Maloney | Feb. 7, 1950 |
| 2,574,902 | Bechtold et al. | Nov. 13, 1951 |
| 2,588,853 | Kumins | Mar. 11, 1952 |